(12) United States Patent
Xu

(10) Patent No.: US 12,219,494 B2
(45) Date of Patent: Feb. 4, 2025

(54) METHODS FOR ADJUSTING UPLINK POWER AND RELATED DEVICE

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 492 days.

(21) Appl. No.: 17/688,544

(22) Filed: Mar. 7, 2022

(65) Prior Publication Data
US 2022/0191799 A1    Jun. 16, 2022

Related U.S. Application Data

(63) Continuation of application No. PCT/CN2019/116889, filed on Nov. 8, 2019.

(51) Int. Cl.
*H04W 52/10* (2009.01)
*H04W 52/08* (2009.01)
*H04W 52/14* (2009.01)

(52) U.S. Cl.
CPC .......... *H04W 52/10* (2013.01); *H04W 52/08* (2013.01); *H04W 52/146* (2013.01)

(58) Field of Classification Search
CPC .............................................. H04W 88/00–06
See application file for complete search history.

(56) References Cited

U.S. PATENT DOCUMENTS

| | | | | |
|---|---|---|---|---|
| 2014/0293843 | A1* | 10/2014 | Papasakellariou | H04L 5/0037 370/280 |
| 2014/0307652 | A1* | 10/2014 | Zhang | H04L 5/0053 370/329 |
| 2015/0319718 | A1* | 11/2015 | Yang | H04W 76/15 370/252 |
| 2018/0146433 | A1* | 5/2018 | Zhang | H04W 72/0473 |
| 2018/0332541 | A1 | 11/2018 | Liu et al. | |
| 2019/0261281 | A1* | 8/2019 | Jung | H04W 72/0473 |

(Continued)

FOREIGN PATENT DOCUMENTS

| | | |
|---|---|---|
| CN | 101627554 A | 1/2010 |
| CN | 103037488 A | 4/2013 |

(Continued)

OTHER PUBLICATIONS

3GPP TS 38.212 V15.4.0 (Dec. 2018), Multiplexing and channel coding (Release 15), 96 pages.

(Continued)

*Primary Examiner* — San Htun
(74) *Attorney, Agent, or Firm* — Young Basile Hanlon & MacFarlane, P.C.

(57) ABSTRACT

A method for adjusting uplink power and a terminal device are provided. The method includes the following. Downlink control information (DCI) is received. A target open-loop power parameter is determined from open-loop power parameters configured, and a closed-loop power parameter adjustment value is determined according to the DCI. Transmit power is determined according to the target open-loop power parameter and the closed-loop power parameter adjustment value.

20 Claims, 4 Drawing Sheets

(56) References Cited

U.S. PATENT DOCUMENTS

2020/0413345 A1\* 12/2020 Yao .................. H04W 52/54
2021/0105726 A1\* 4/2021 Yao .................. H04W 52/242

FOREIGN PATENT DOCUMENTS

| CN | 110073699 A | 7/2019 |
| CN | 110235479 A | 9/2019 |
| WO | 2013166695 A1 | 11/2013 |
| WO | 2019201253 A1 | 10/2019 |

OTHER PUBLICATIONS

3GPP TS 38.331 V15.4.0 (Dec, 2018), Radio Resource Control (RRC) protocol specification (Release 15), 474 pages.

International Search Report with English Translation for PCT Application PCT/CN2019/116889 mailed Jul. 21, 2020. (14 pages).

3GPP TSG-RAN WG1 Meeting #97 Reno, USA, R1-1907760, Ericsson, Feature lead summary#2 on physical layer control procedures for NTN, May 13-17, 2019 . (8 pages).

Chinese First Office Action with English Translation for CN Application 202210500509.7 mailed Jun. 1, 2023. (19 pages).

MCC Support, Final Report of 3GPP TSG RAN WG1 #98bis v2.0.0 (Chongqing, China, Oct. 14-20, 2019), 3GPP TSG RAN WG1 Meeting #99, R1-1913275, Nov. 18-22, 2019. (160 pages).

Ericsson, URLLC specific power control, 3GPP TSG-RAN WG2#103, Tdoc R2-1811632, Aug. 20-24, 2018. (3 pages).

Vivo, Other enhancements for URLLC, 3GPP TSG RAN WG1 Meeting #94bis, R1-1810398, Oct. 8-12, 2018. (3 pages).

Panasonic, Discussion on uplink power control for NR URLLC, 3GPP TSG RAN WG1 Meeting #93, R1-1806179, May 21-25, 2018. (2 pages).

Extended European Search Report for EP Application 19951450.6 mailed Jul. 15, 2022. (14 pages).

\* cited by examiner

METHODS FOR ADJUSTING UPLINK POWER AND RELATED DEVICE

CROSS-REFERENCE TO RELATED APPLICATION(S)

This application is a continuation of International Application No. PCT/CN2019/116889, filed Nov. 8, 2019, the entire disclosure of which is hereby incorporated by reference.

TECHNICAL FIELD

This application relates to the field of communication, and in particular to methods for adjusting uplink power and a terminal device.

BACKGROUND

At present, ultra-reliable low latency communication (URLLC) and enhanced mobile broadband (eMBB) are introduced in a new radio (NR) system. URLLC has a characteristic of achieving ultra-high reliability (for example, 99.999%) transmission within a stringent latency (for example, 1 ms), and eMBB has a characteristic of being insensitive to latency and supporting a large amount of transmission. For a scenario where URLLC and eMBB coexist, in order to realize URLLC instant transmission, collisions may occur between URLLC and eMBB. That is, URLLC may occupy a resource that has been allocated to eMBB. When a URLLC transmission is in collision with an eMBB transmission, URLLC and eMBB will interfere with each other, thereby affecting demodulation performance of URLLC and eMBB. Such problem may be overcome by retransmission which, however, may lead to an increased transmission latency of URLLC.

There are two main solutions to the problem of collisions between uplink URLLC and eMBB transmissions: 1) stop the eMBB transmission to reduce interference to URLLC; 2) increase transmit power of URLLC to make sure that a receiving signal to interference plus noise ratio (SINR) of URLLC can still meet a demodulating requirement even if eMBB interference exists. The former eliminates completely the interference but increases complexity of an eMBB terminal. The latter maintains the receiving SINR by improving power of a desired signal and requires to enhance URLLC only.

Uplink power control is very important in a wireless system. Through the uplink power control, a UE in a cell can not only ensure the quality of uplink transmission data, but also reduce the interference to other users in the system as much as possible, and extend a battery life of the UE. In an NR release 15 (Rel 15) system, uplink data of different users in a same cell is orthogonal. Therefore, the uplink power control adopted by the NR Rel 15 system mainly considers the use of power control to adapt the uplink transmission to different wireless transmission environments, including path loss, shadow fading, etc. A combination of open-loop and closed-loop control is used in NR Rel 15.

When a collision between URLLC and eMBB occurs during data retransmission using a dynamically scheduled configured grant-physical uplink shared channel (CG-PUSCH), the problem of transmission collision between URLLC and eMBB can be addressed by adjusting the transmit power. However, there is no solution to URLLC power adjustment in related arts.

SUMMARY

In a first aspect, a method for adjusting uplink power is provided in implementations of the present application. The method includes the following.

Downlink control information (DCI) is received. According to the DCI, a target open-loop power parameter is determined from open-loop power parameters configured by power parameter configuration information, and a closed-loop power parameter adjustment value is determined according to the DCI. Transmit power is determined according to the target open-loop power parameter and the closed-loop power parameter adjustment value.

In a second aspect, another method for adjusting uplink power is provided in implementations of the present application. The method includes the following.

Power parameter configuration information is transmitted to a terminal device. DCI is transmitted to the terminal device, where the DCI indicates that the terminal device determines, according to the DCI, a target open-loop power parameter from open-loop power parameters configured by the power parameter configuration information, and determines a closed-loop power parameter adjustment value according to the DCI.

In a third aspect, a terminal device is provided in implementations of the present application. The terminal device includes a memory configured to store a program and a processor configured to execute the program stored in the memory. When the program stored in the memory is executed, the processor is configured to carry out the method of the first aspect.

These and other aspects of the present application will be more clearly understood from the description of the following implementations.

BRIEF DESCRIPTION OF DRAWINGS

In order to explain technical solutions in implementations of the present disclosure or in the related art more clearly, the following will briefly introduce the drawings that need to be used in the description of the implementations or the related art.

DETAILED DESCRIPTION

Detailed descriptions are given below.

The terms "first", "second", "third", and "fourth" in the specification and claims of the present application and the drawings are used to distinguish different objects, rather than to describe a specific order. In addition, the terms "including" and "having" and any variations thereof are intended to cover non-exclusive inclusions. For example, a process, method, system, product, or device that includes a series of steps or units is not limited to the listed steps or units, but optionally includes unlisted steps or units, or optionally further includes other steps or units inherent in the process, method, product, or device.

Reference to "implementation" herein means that a specific feature, structure, or characteristic described in conjunction with the implementation may be included in at least one implementation of the present application. The appearance of the phrase in various places in the specification does not necessarily refer to the same implementation, nor is it an independent or alternative implementation mutually exclusive with other implementations. Those skilled in the art clearly and implicitly understand that the implementation described herein can be combined with other implementations.

Figure 1:
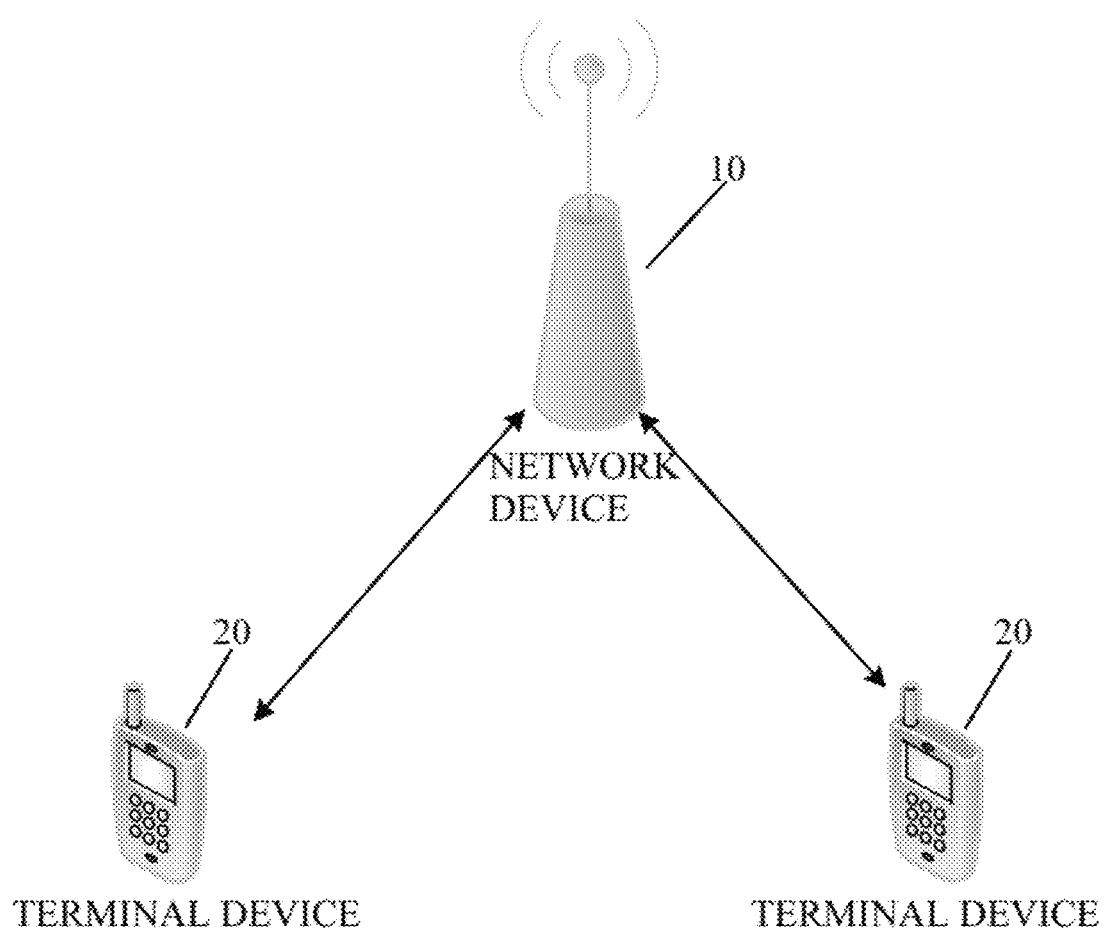
FIG. 1 is a schematic diagram of an application scenario of a method for adjusting uplink power provided in implementations of the present application.

Referring to FIG. 1, FIG. 1 is a schematic diagram of an application scenario of a method for adjusting uplink power provided in implementations of the present application. As illustrated in FIG. 1, a network device 10 and a terminal device 20 are included in the application scenario. The application scenario illustrated in FIG. 1 can be specifically applied to a 5G communication system or a subsequent evolved communication system.

The network device 10 may be a base station for next-generation communication, such as a fifth generation (5G) gNB or a small station, a micro station, a transmission reception point (TRP), etc.

The terminal device 20 may be a user equipment (UE), that is, a device that provides voice and/or data connectivity to a user, and may also be a handheld device or an in-vehicle device with a wireless connection function. A common terminal device 20 includes a mobile phone, a tablet computer, a notebook computer, a palmtop computer, a mobile Internet device (MID), an Internet of Things device, a wearable device (for example, a smart watch, a smart bracelet, a pedometer), etc.

For data retransmission with a dynamic scheduled configured grant-physical uplink shared channel (CG-PUSCH), when a collision between URLLC and eMBB occurs, the network device 10 transmits downlink control information (DCI) to the terminal device 20. The terminal device 20 obtains an open-loop power parameter and a closed-loop power parameter adjustment value according to the DCI, and calculates transmit power according to the open-loop power parameter and the closed-loop power parameter adjustment value and transmits data retransmissions to the network device 10 with the transmit power.

Figure 2:
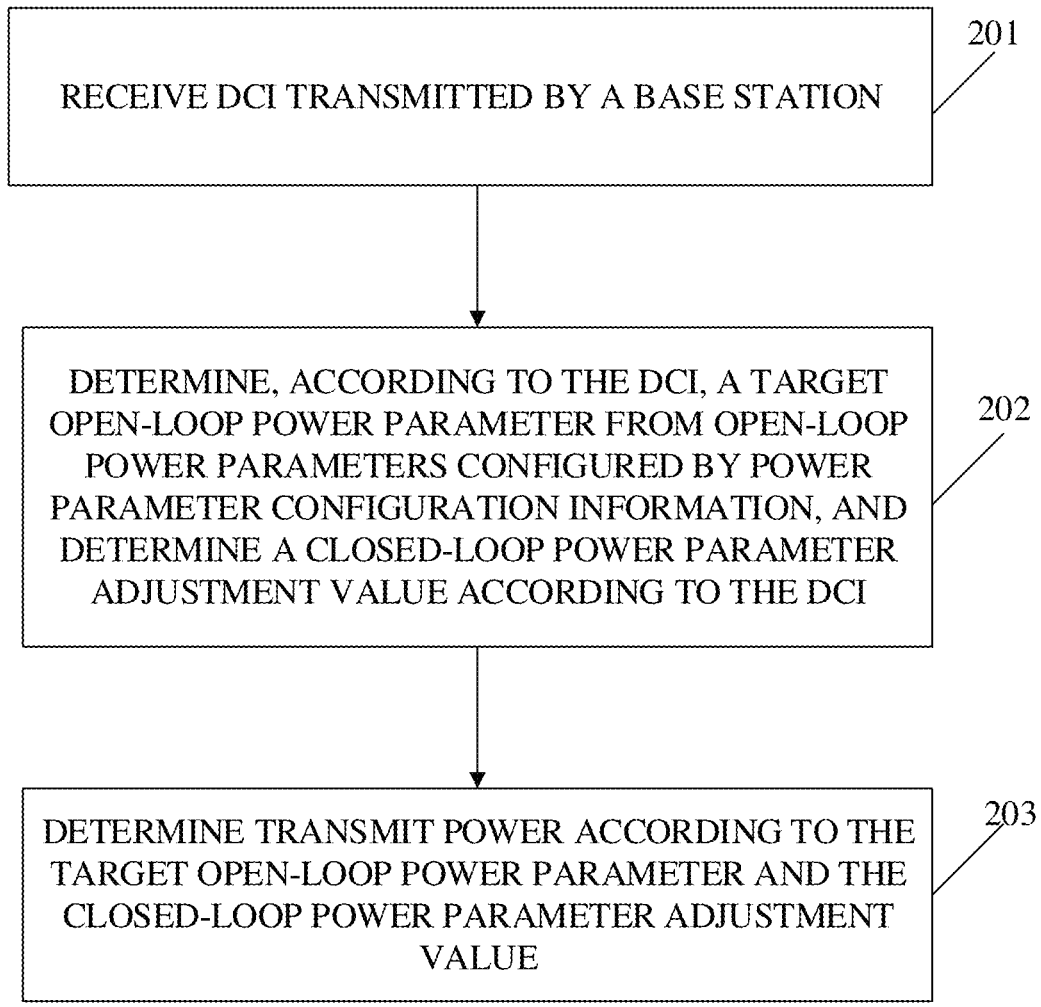
FIG. 2 is a schematic flowchart of a method for adjusting uplink power provided in implementations of the present application.

Referring to FIG. 2, FIG. 2 is a schematic flowchart of a method for adjusting uplink power provided in implementations of the present application. As illustrated in FIG. 2, the method includes the following.

At S201, DCI is received.

In one example, before the DCI is received, power parameter configuration information is received, where in the power parameter configuration information, open-loop power parameters are configured.

It can be understood that the DCI may also indicate a mode in which the terminal device transmits data, such as a time-frequency resource used and the like.

A cyclic redundancy check (CRC) for a physical downlink control channel (PDCCH) carrying the DCI is scrambled by a configured scheduling-radio network temporary identifier (CS-RNTI), and a new data indicator (NDI) field in the DCI has a value of 1.

At S202, according to the DCI, a target open-loop power parameter is determined from open-loop power parameters configured by the power parameter configuration information, and a closed-loop power parameter adjustment value is determined according to the DCI.

In a possible implementation, if the open-loop power parameters configured by the power parameter configuration information are open-loop power parameters used in an uplink dynamic transmission, and the open-loop power parameters configured by the power parameter configuration information include p0-AlphaSets and P0 in grant-free scheduling, the target open-loop power parameter is determined from the open-loop power parameters configured by the power parameter configuration information according to the DCI as follows.

If open-loop power parameter indication information exists in the DCI, in the open-loop power parameters configured by the power parameter configuration information, an open-loop power parameter indicated by the open-loop power parameter indication information is determined as the target open-loop power parameter.

If no open-loop power parameter indication information exists in the DCI, one of the open-loop power parameters configured by the power parameter configuration information is determined as the target open-loop power parameter.

Specifically, when the open-loop power parameters configured by the power parameter configuration information include only P0 in grant-free scheduling and p0-AlphaSets, the open-loop power parameter indication information indicates a power parameter configuration through different values of 1 bit. If the 1 bit has a value of 1, the open-loop power parameter indicated by the open-loop power parameter indication information is P0 in grant-free scheduling. If the 1 bit has a value of 0, the open-loop power parameter indicated by the open-loop power parameter indication information is p0-AlphaSets.

Of course, it can also be the case that if the 1 bit has a value of 0, the open-loop power parameter indicated by the open-loop power parameter indication information is P0 in grant-free scheduling, and if the 1 bit has a value of 1, the open-loop power parameter indicated by the open-loop power parameter indication information is p0-AlphaSets.

When the open-loop power parameters configured by the power parameter configuration information include not only a power parameter configuration including P0 in grant-free scheduling and p0-AlphaSets, but also other power parameter configurations, the open-loop power parameter indication information indicates different power parameter configurations through different values of multiple bits. The indication is similar to the above, which will not be repeated herein.

In a possible implementation, if the open-loop power parameters configured by the power parameter configuration information are open-loop power parameters used in an uplink dynamic transmission, an open-loop power parameter is determined from the power parameter configuration information according to scheduled DCI as follows.

If the DCI includes open-loop power parameter indication information, in the open-loop power parameters configured by the power parameter configuration information, an open-loop power parameter indicated by the open-loop power parameter indication information is determined as the target open-loop power parameter.

If no open-loop power parameter indication information exists in the DCI, one of the open-loop power parameters configured by the power parameter configuration information is determined as the target open-loop power parameter.

In this implementation, the open-loop power parameters configured by the power parameter configuration information include multiple open-loop power parameters. A mapping between different values indicated by the open-loop power parameter indication information and the multiple open-loop power parameters can be established. Therefore, the target open-loop power parameter can be obtained through the open-loop power parameter indication information.

In a possible implementation, the open-loop power parameters configured by the power parameter configuration information are open-loop power parameters used in an initial transmission of an uplink semi-persistent transmission.

Optionally, the open-loop power parameters configured by the power parameter configuration information are open-loop power parameters used in a retransmission of the uplink semi-persistent transmission.

In case that the open-loop power parameters configured by the power parameter configuration information are open-loop power parameters used in the initial transmission of the uplink semi-persistent transmission, the open-loop power parameters used in the initial transmission and retransmission of the uplink semi-persistent transmission belong to a same power parameter configuration. Generally, the open-loop power parameters include p0-PUSCH-Alpha.

In a possible implementation, the open-loop power parameters configured by the power parameter configuration information include p0-PUSCH-Alpha, and the open-loop power parameters configured by the power parameter configuration information are open-loop power parameters used in an initial transmission of an uplink semi-persistent transmission. The target open-loop power parameter is determined from the open-loop power parameters configured by the power parameter configuration information according to the DCI as follows.

If the DCI includes no open-loop power parameter indication information, one of the open-loop power parameters configured by the power parameter configuration information is determined as the target open-loop power parameter. Generally, the open-loop power parameter is a power parameter configuration p0-PUSCH-Alpha.

If the DCI includes the open-loop power parameter indication information, an open-loop power parameter indicated by the open-loop power parameter indication information in the open-loop power parameters configured by the power parameter configuration information is determined as the target open-loop power parameter.

In a possible implementation, p0-AlphaSets includes P0 parameter configuration and/or alpha parameter configuration.

Each of the open-loop power parameters configured by the power parameter configuration information includes the P0 parameter configuration and/or the alpha parameter configuration.

The P0 parameter configuration and the alpha parameter configuration are valid simultaneously or only the P0 parameter configuration is valid.

Since the open-loop power parameters configured by the power parameter configuration information include p0-PUSCH-Alpha, and may optionally include other open-loop power parameters, "each of the open-loop power parameters configured by the power parameter configuration information includes the P0 parameter configuration and/or the alpha parameter configuration" means that not only p0-PUSCH-Alpha includes the P0 parameter configuration and/or the alpha parameter configuration, but also other open-loop power parameters may include the P0 parameter configuration and/or the alpha parameter configuration.

In a possible implementation, the DCI further includes closed-loop power parameter indication information. The closed-loop power parameter adjustment value is a current closed-loop power parameter, where the current closed-loop power parameter is a power parameter indicated by the closed-loop power parameter indication information. Alternatively, the closed-loop power parameter adjustment value is a sum of the current closed-loop power parameter and a historical (previous) closed-loop power parameter. Alternatively, the closed-loop power parameter adjustment value is a sum of a historical value of a closed-loop power parameter corresponding to the target open-loop power parameter and the current closed-loop power parameter.

Assume that the closed-loop power parameter indication information is implemented with 2 bits, which have corresponding values of 00, 01, 10, and 11. A set of closed-loop power parameters is {step0, step1, step2, step3}. The set includes 4 closed-loop power parameters that can be indicated through the closed-loop power parameter indication information of 2 bits respectively. For example, 00 corresponds to step0, 01 corresponds to step1, 10 corresponds to step2, and 11 corresponds to step3.

Assume that a set of open-loop power parameters specified in a protocol or configured by higher-layer information is $\{P_{00}, P_{01}\}$, and closed-loop power parameters are (step0, step1, step2, step3).

Power information is indicated by a combination of an open-loop power parameter indication bit (A) and closed-loop power parameter indication bits (B).

The network device indicates power control information with 3 bits in the DCI. 1 bit indicates an open-loop power parameter (C), where 0 or 1 corresponds to one open-loop power parameter in the set of open-loop power parameters respectively. 2 bits indicate a closed-loop power parameter (D), where 00, 01, 10, or 11 corresponds to one closed-loop power parameter in the set of closed-loop power parameters.

Table 1 below is a table of correspondence between power control information and open-loop power parameters and closed-loop power parameters.

TABLE 1

| Open-loop power parameter indication bit (A) | Closed-loop power parameter indication bits (B) | Open-loop power parameter | Current closed-loop power parameter |
|---|---|---|---|
| 0 | 00 | $P_{00}$ | step0 |
| 0 | 01 | $P_{00}$ | step1 |
| 0 | 10 | $P_{00}$ | step2 |
| 0 | 11 | $P_{00}$ | step3 |
| 1 | 00 | $P_{01}$ | step0 |
| 1 | 01 | $P_{01}$ | step1 |
| 1 | 10 | $P_{01}$ | step2 |
| 1 | 11 | $P_{01}$ | step3 |

Power control information bits transmitted by the network device are A=0, B=00, where A=0 indicates that the target open-loop power parameter is $P_{00}$, and B=00 indicates that the current closed-loop power parameter is step0.

Power control information bits transmitted by the network device are A=1, B=00, where A=1 indicates that the target open-loop power parameter is $P_{01}$, and B=00 indicates that the current closed-loop power parameter is step0.

Similarly, A indicates the target open-loop power parameter, and B indicates the closed-loop power parameter. Both the target open-loop power parameter and the closed-loop power parameter are required in calculation of transmit power.

At S203, the transmit power is determined according to the target open-loop power parameter and the closed-loop power parameter adjustment value.

After the target open-loop power parameter and the closed-loop power parameter adjustment value are obtained, the transmit power can be calculated according to the following expression.

$$P_{PUSCHb,f,c}(i, j, q_d, l) = \min\left\{\begin{array}{l} P_{CMAXf,c}(i), \\ P_{O_{PUSCHb,f,c}}(j) + 10\log_{10}\left(2\mu \cdot M_{RB,f,b,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\}$$

In this expression, i represents an index of an PUSCH transmission, j represents an index of an open-loop power control parameter (including target power $P_{O_{PUSCHb,f,c}}(j)$ and path loss factor $\alpha_{b,f,c}(j)$), $q_d$ represents an index of a reference signal used for path loss measurement and is used to obtain a path loss value $PL_{b,f,c}(q_d)$, which is also an open-loop power parameter, and $f_{b,f,c}(i,l)$ represents an adjustment factor for closed-loop power control, where l represents a process of closed-loop power control.

As can be seen, in implementations of the present disclosure, the DCI is received. According to the DCI, the target open-loop power parameter is obtained from the open-loop power parameters configured by the power parameter configuration information, and the closed-loop power parameter adjustment value is obtained according to the DCI. The transmit power is determined according to the target open-loop power parameter and the closed-loop power parameter adjustment value. The implementations of the present disclosure are used to solve the problem of how to adjust power in case of collision between URLLC and eMBB during retransmission, so that signal interference between URLLC and eMBB can be overcome in case of collision between URLLC and eMBB.

Figure 3:
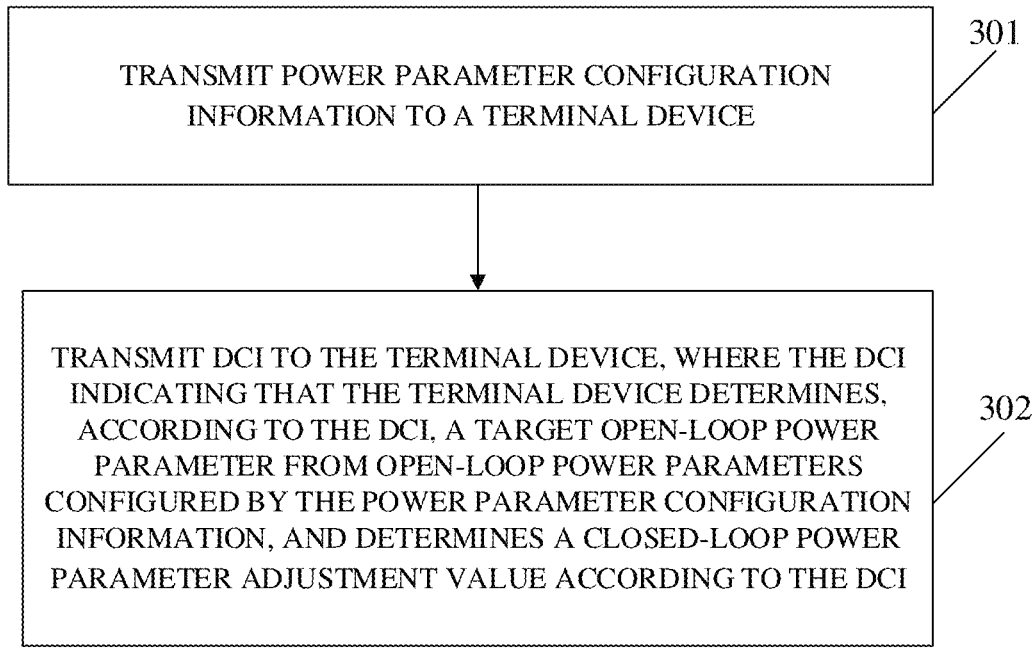
FIG. 3 is a schematic flowchart of a method for adjusting uplink power provided in implementations of the present application.

Referring to FIG. 3, FIG. 3 is a schematic flowchart of another method for adjusting uplink power provided in implementations of the present application. As illustrated in FIG. 3, the method includes the following.

At S301, power parameter configuration information is transmitted to a terminal device.

At S302, DCI is transmitted to the terminal device, where the DCI instructs the terminal device to determine, according to the DCI, a target open-loop power parameter from open-loop power parameters configured by the power parameter configuration information, and determine a closed-loop power parameter adjustment value according to the DCI.

It can be understood that the DCI may also be used to indicate a mode of data transmission by the terminal device.

In a possible implementation, the open-loop power parameters are open-loop power parameters used in an uplink dynamic transmission.

Further, the open-loop power parameters include p0-AlphaSets and P0 in grant-free scheduling.

In a possible implementation, the open-loop power parameters are open-loop power parameters used in an initial transmission of an uplink semi-persistent transmission.

Further, the open-loop power parameters include p0-PUSCH-Alpha.

In a possible implementation, if open-loop power parameter indication information exists in the DCI, the target open-loop power parameter is an open-loop power parameter indicated by the open-loop power parameter indication information in the open-loop power parameters. If no open-loop power parameter indication information exists in the DCI, the target open-loop power parameter is one of the open-loop power parameters.

In a possible implementation, a CRC for a PDCCH carrying the DCI is scrambled by a CS-RNTI, and an NDI field in the DCI has a value of 1.

In a possible implementation, a P0 parameter configuration and an alpha parameter configuration are valid simultaneously or only the P0 parameter configuration is valid.

In a possible implementation, the DCI further includes closed-loop power parameter indication information. The closed-loop power parameter adjustment value is a current closed-loop power parameter, a sum of a historical closed-loop power parameter and the current closed-loop power parameter, or a sum of a historical value of a closed-loop power parameter corresponding to the target open-loop power parameter and the current closed-loop power parameter, where the current closed-loop power parameter is obtained according to the closed-loop power parameter indication information.

It should be noted here that the specific description of this implementation can refer to the relevant description of the implementation illustrated in FIG. 2, which will not be repeated herein.

Figure 4:
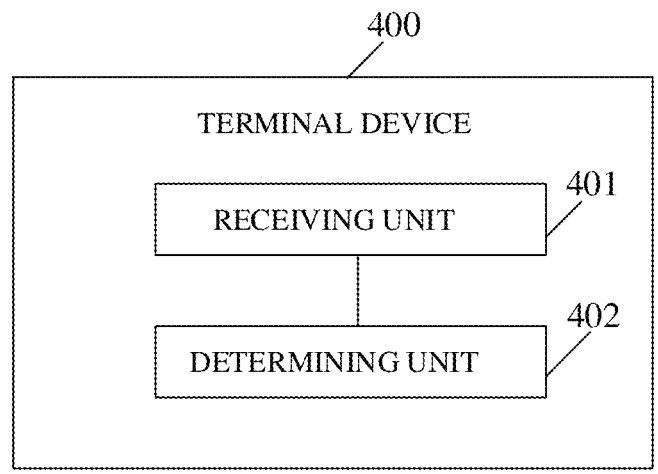
FIG. 4 is a schematic structural diagram of a terminal device provided in implementations of the present application.

Referring to FIG. 4, FIG. 4 is a schematic structural diagram of a terminal device provided in implementations of the present application. As illustrated in FIG. 4, the terminal device 400 includes a receiving unit 401 and a determining unit 402.

The receiving unit 401 is configured to receive DCI.

The determining unit 402 is configured to determine, according to the DCI, a target open-loop power parameter from open-loop power parameters configured by power parameter configuration information, and determine a closed-loop power parameter adjustment value according to the DCI.

The determining unit 402 is further configured to determine transmit power according to the target open-loop power parameter and the closed-loop power parameter adjustment value.

In a possible implementation, the open-loop power parameters are open-loop power parameters used in an uplink dynamic transmission.

Further, the open-loop power parameters include p0-AlphaSets and P0 in grant-free scheduling.

In a possible implementation, the open-loop power parameters are open-loop power parameters used in an initial transmission of an uplink semi-persistent transmission.

Further, the open-loop power parameters include p0-PUSCH-Alpha.

In a possible implementation, in terms of determining, according to the DCI, the target open-loop power parameter from the open-loop power parameters configured by the power parameter configuration information, the determining unit 402 is specifically configured to determine an open-loop power parameter indicated by open-loop power parameter indication information in the open-loop power parameters as the target open-loop power parameter if the open-loop power parameter indication information exists in the DCI, and determine one of the open-loop power parameters as the target open-loop power parameter if no open-loop power parameter indication information exists in the DCI.

In a possible implementation, a CRC for a PDCCH carrying the DCI is scrambled by a CS-RNTI, and an NDI field in the DCI has a value of 1.

In a possible implementation, a P0 parameter configuration and an alpha parameter configuration are valid simultaneously or only the P0 parameter configuration is valid.

In a possible implementation, the DCI further includes closed-loop power parameter indication information. The closed-loop power parameter adjustment value is a current closed-loop power parameter, where the current closed-loop power parameter is obtained according to the closed-loop power parameter indication information. Alternatively, the closed-loop power parameter adjustment value is a sum of a historical closed-loop power parameter and the current closed-loop power parameter. Alternatively, the closed-loop power parameter adjustment value is a sum of a historical value of a closed-loop power parameter corresponding to the target open-loop power parameter and the current closed-loop power parameter.

It should be noted that the respective units (the receiving unit 401 and the determining unit 402) are configured to carry out relevant steps of the above-described method. For example, the receiving unit 401 is configured to carry out the step S201, and the determining unit 402 is configured to carry out the steps S202 and S203.

In this implementation, the terminal device 400 is presented in a form of units. A "unit" herein may refer to an application-specific integrated circuit (ASIC), a processor and memory executing one or more software or firmware programs, an integrated logic circuit, and/or other devices that can provide the above-described functions. In addition, the above receiving unit 401 and determining unit 402 may be implemented by a processor 601 of a communication device illustrated in FIG. 6.

Figure 5:
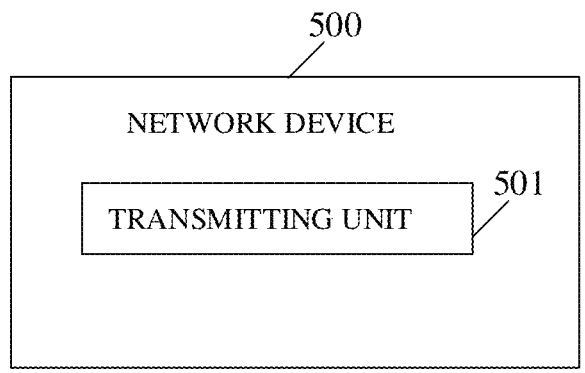
FIG. 5 is a schematic structural diagram of a network device provided in implementations of the present application.

Referring to FIG. 5, FIG. 5 is a schematic structural diagram of another network device provided in implementations of the present application. As illustrated in FIG. 5, the network device 500 includes a transmitting unit 501.

The transmitting unit 501 is configured to transmit power parameter configuration information to a terminal device.

The transmitting unit 501 is further configured to transmit DCI to the terminal device, where the DCI indicates that the terminal device determines, according to the DCI, a target open-loop power parameter from open-loop power parameters configured by the power parameter configuration information, and determines a closed-loop power parameter adjustment value according to the DCI.

In a possible implementation, the open-loop power parameters are open-loop power parameters used in an uplink dynamic transmission.

Further, the open-loop power parameters include p0-AlphaSets and P0 in grant-free scheduling.

In a possible implementation, the open-loop power parameters are open-loop power parameters used in an initial transmission of an uplink semi-persistent transmission.

Further, the open-loop power parameters include p0-PUSCH-Alpha.

In a possible implementation, if open-loop power parameter indication information exists in the DCI, the target open-loop power parameter is an open-loop power parameter indicated by the open-loop power parameter indication information in the open-loop power parameters. If no open-loop power parameter indication information exists in the DCI, the target open-loop power parameter is one of the open-loop power parameters.

In a possible implementation, a CRC for a PDCCH carrying the DCI is scrambled by a CS-RNTI, and an NDI field in the DCI has a value of 1.

In a possible implementation, a P0 parameter configuration and an alpha parameter configuration are valid simultaneously or only the P0 parameter configuration is valid.

In a possible implementation, the DCI further includes closed-loop power parameter indication information. The closed-loop power parameter adjustment value is a current closed-loop power parameter, a sum of a historical closed-loop power parameter and the current closed-loop power parameter, or a sum of a historical value of a closed-loop power parameter corresponding to the target open-loop power parameter and the current closed-loop power parameter, where the current closed-loop power parameter is obtained according to the closed-loop power parameter indication information.

It should be noted that the respective unit (the transmitting unit 501) is configured to carry out relevant steps of the above-described method. For example, the transmitting unit 501 is configured to carry out the steps S301 and S302.

In this implementation, the network device 500 is presented in a form of units. A "unit" herein may refer to an ASIC, a processor and memory executing one or more software or firmware programs, an integrated logic circuit, and/or other devices that can provide the above-described functions. In addition, the above-described implementation process may be implemented by the processor 601 of the communication device illustrated in FIG. 6.

Figure 6:
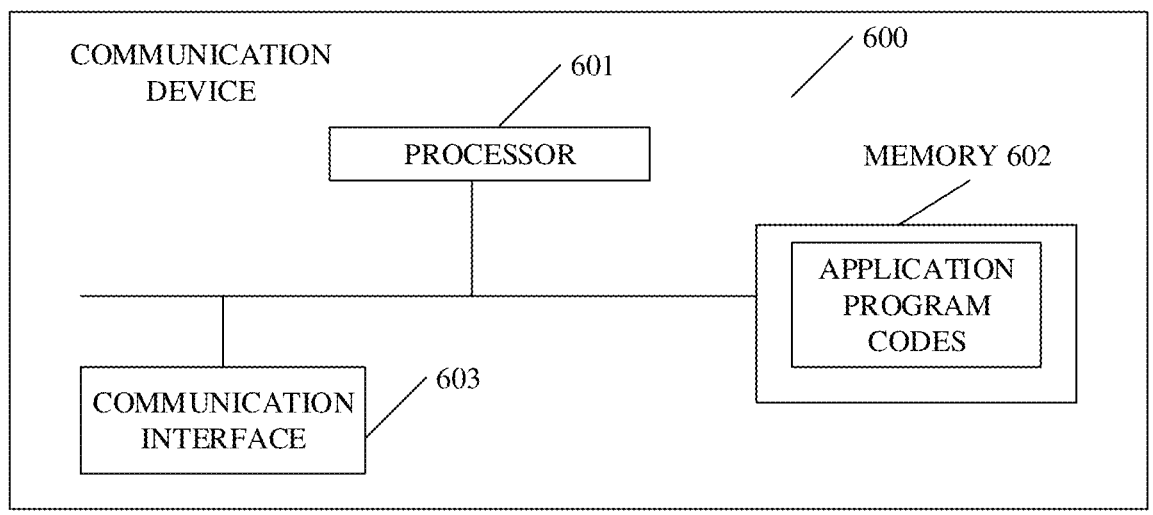
FIG. 6 is a schematic structural diagram of a communication device provided in implementations of the present application.

As illustrated in FIG. 6, the communication device 600 can be implemented with a structure in FIG. 6. The communication device 600 includes at least one processor 601, at least one memory 602, and at least one communication interface 603. The processor 601, the memory 602, and the communication interface 603 are coupled together and communicate with each other through a communication bus.

The processor 601 may be a general-purpose central processing unit (CPU), a microprocessor, an ASIC, or one or more integrated circuits for controlling execution of programs in the above solutions.

The communication interface 603 is configured to communicate with other devices or a communication network, such as Ethernet, a radio access network (RAN), a wireless local area network (WLAN), etc.

The memory 602 may be a read-only memory (ROM) or other types of static storage devices that can store static information and instructions, a random access memory (RAM) or other types of dynamic storage devices that can store information and instructions, an electrically erasable programmable read-only memory (EEPROM), a compact disc read-only memory (CD-ROM) or other optical disk storages, an optical disk storage (including a compact disc, a laser disc, an optical disc, a digital versatile disc, a Blu-ray disc, etc.), a magnetic disk storage medium or other magnetic storage devices, or any other medium capable of carrying or storing desired program codes in the form of instructions or data structures and capable of being accessed by a computer, which are not limited herein. The memory can exist independently and be coupled to the processor through a bus. The memory can also be integrated with the processor.

The memory 602 is configured to store application program codes for executing the above solutions, and the execution is controlled by the processor 601. The processor 601 is configured to execute the application program codes stored in the memory 602.

The codes stored in the memory 602 can implement part of or all steps of any of the above-mentioned method for adjusting uplink power.

Implementations of the present disclosure further provide a computer storage medium, where the computer storage medium may store a program, and when the program is executed, part of or all steps of any of the above-mentioned method for adjusting uplink power described in the above method implementations are implemented.

It should be noted that, for the sake of simple description, the foregoing method implementations are all expressed as a series of action combinations, but those skilled in the art should know that the present disclosure is not limited by the described action sequence. As in accordance with the present disclosure, certain steps may be performed in other orders or simultaneously. Secondly, those skilled in the art should also know that the implementations described in the specification are all preferred implementations, and the actions and modules involved are not necessarily required by the present disclosure.

In the above-mentioned implementations, the description of each implementation has its own emphasis. For parts that are not described in detail in a certain implementation, reference may be made to the relevant descriptions of other implementations.

In several implementations provided in this application, it should be understood that the disclosed apparatus may be implemented in other manners. For example, the apparatus implementations described above are only illustrative, for example, the division of the units is only a logical function division, and there may be other division methods in actual implementation, for example, multiple units or components may be combined or integrated into another system, or some features can be ignored, or not implemented. On the other hand, the shown or discussed mutual coupling or direct coupling or communication connection may be indirect coupling or communication connection through some interfaces, devices, or units, and may be in electrical or other forms.

The units described as separate components may or may not be physically separated, and components illustrated as units may or may not be physical units, that is, may be located in one place, or may be distributed to multiple network units. Some or all of the units may be selected according to actual needs to achieve the purpose of the solution in implementations.

In addition, each functional unit in each implementation of the present disclosure may be integrated into one processing unit, or each unit may exist physically alone, or two or more units may be integrated into one unit. The above-mentioned integrated unit may be implemented in the form of hardware, or may be implemented in the form of software functional units.

The integrated unit, if implemented in the form of software functional units and sold or used as a stand-alone product, may be stored in a computer-readable memory. Based on such understanding, the essence of the technical solution of the present disclosure, or the part of the technical solution of the present disclosure that contributes to the prior art, or all or part of the technical solution, can be embodied in the form of software products, and the computer software product is stored in a memory, where the memory includes several instructions to cause a computer device (which may be a personal computer, a server, or a network device, etc.) to execute all or part of the steps of the methods described in the various implementations of the present disclosure. The aforementioned memory includes a U disk, a ROM, a RAM, mobile hard disk, magnetic disk or optical disk and other media that can store program codes.

Those of ordinary skill in the art can understand that all or part of the steps in the various methods of the above implementations can be completed by instructing relevant hardware through a program, and the program can be stored in a computer-readable memory, and the memory can include a flash disk, a ROM, a RAM, a magnetic disk or CD, etc.

The implementations of the present disclosure have been introduced in detail above, and specific examples are used to illustrate the principles and implementations of the present disclosure. The descriptions of the above implementations are only used to help understand the methods and core ideas of the present disclosure; at the same time, persons of ordinary skill in the art, according to the idea of the present disclosure, will have changes in the specific implementations and application scope. To sum up, the content of this description should not be construed as a limitation of the present disclosure.

What is claimed is:

1. A method for adjusting uplink power, comprising:
receiving downlink control information (DCI);
determining, according to the DCI, a target open-loop power parameter from open-loop power parameters configured by power parameter configuration information, and determining a closed-loop power parameter adjustment value according to the DCI; and
determining transmit power according to the target open-loop power parameter and the closed-loop power parameter adjustment value;
wherein the DCI comprises closed-loop power parameter indication information, and the closed-loop power parameter adjustment value is a sum of a historical value of a closed-loop power parameter corresponding to the target open-loop power parameter and a current closed-loop power parameter, wherein the current closed-loop power parameter is obtained according to the closed-loop power parameter indication information.

2. The method of claim 1, wherein the open-loop power parameters are open-loop power parameters used in an uplink dynamic transmission.

3. The method of claim 2, wherein the open-loop power parameters comprise p0-AlphaSets and P0 in grant-free scheduling.

4. The method of claim 2, wherein a P0 parameter configuration and an alpha parameter configuration are valid simultaneously or only the P0 parameter configuration is valid.

5. The method of claim 1, wherein the open-loop power parameters are open-loop power parameters used in an initial transmission of an uplink semi-persistent transmission.

6. The method of claim 5, wherein the open-loop power parameters comprise p0-PUSCH-Alpha.

7. The method of claim 1, wherein determining, according to the DCI, the target open-loop power parameter from the open-loop power parameters configured by the power parameter configuration information comprises:
determining an open-loop power parameter indicated by open-loop power parameter indication information in the open-loop power parameters as the target open-loop power parameter if the open-loop power parameter indication information exists in the DCI; and determining one of the open-loop power parameters as the target open-loop power parameter if no open-loop power parameter indication information exists in the DCI.

8. The method of claim 1, wherein a cyclic redundancy check (CRC) for a physical downlink control channel (PDCCH) carrying the DCI is scrambled by a configured scheduling-radio network temporary identifier (CS-RNTI), and a new data indicator (NDI) field in the DCI has a value of 1.

9. A network device, comprising:
a transceiver;
a processor; and
a memory configured to store a program which, when executed by the processor, are operable with the transceiver to:
transmit power parameter configuration information to a terminal device; and
transmit downlink control information (DCI) to the terminal device, the DCI indicating that the terminal device determines, according to the DCI, a target open-loop power parameter from open-loop power parameters configured by the power parameter configuration information, and determines a closed-loop power parameter adjustment value according to the DCI;
wherein the DCI comprises closed-loop power parameter indication information, and the closed-loop power parameter adjustment value is a sum of a historical value of a closed-loop power parameter corresponding to the target open-loop power parameter and a current closed-loop power parameter, wherein the current closed-loop power parameter is obtained according to the closed-loop power parameter indication information.

10. The network device of claim 9, wherein the open-loop power parameters are open-loop power parameters used in an uplink dynamic transmission.

11. The network device of claim 10, wherein the open-loop power parameters comprise p0-AlphaSets and P0 in grant-free scheduling.

12. The network device of claim 10, wherein a P0 parameter configuration and an alpha parameter configuration are valid simultaneously or only the P0 parameter configuration is valid.

13. The network device of claim 9, wherein the open-loop power parameters are open-loop power parameters used in an initial transmission of an uplink semi-persistent transmission.

14. The network device of claim 13, wherein the open-loop power parameters comprise p0-PUSCH-Alpha.

15. The network device of claim 9, wherein
the target open-loop power parameter is an open-loop power parameter indicated by open-loop power parameter indication information in the open-loop power parameters if the open-loop power parameter indication information exists in the DCI; and the target open-loop power parameter is one of the open-loop power parameters if no open-loop power parameter indication information exists in the DCI.

16. The network device of claim 9, wherein a cyclic redundancy check (CRC) for a physical downlink control channel (PDCCH) carrying the DCI is scrambled by a configured scheduling-radio network temporary identifier (CS-RNTI), and a new data indicator (NDI) field in the DCI has a value of 1.

17. A terminal device, comprising:
a transceiver;
a processor; and
a memory configured to store a program which, when executed by the processor, are operable with the transceiver to:
receive downlink control information (DCI);
the program, when executed by the processor, being operable with the processor to:
determine, according to the DCI, a target open-loop power parameter from open-loop power parameters configured by power parameter configuration information, and determine a closed-loop power parameter adjustment value according to the DCI; and
determine transmit power according to the target open-loop power parameter and the closed-loop power parameter adjustment value;
wherein the DCI comprises closed-loop power parameter indication information, and the closed-loop power parameter adjustment value is a sum of a historical value of a closed-loop power parameter corresponding to the target open-loop power parameter and a current closed-loop power parameter, wherein the current closed-loop power parameter is obtained according to the closed-loop power parameter indication information.

18. The terminal device of claim 17, wherein the open-loop power parameters are open-loop power parameters used in an uplink dynamic transmission.

19. The terminal device of claim 17, wherein the program, when executed by the processor, operable with the processor to determine, according to the DCI, the target open-loop power parameter from the open-loop power parameters configured by the power parameter configuration information are operable with the processor to:
determine an open-loop power parameter indicated by open-loop power parameter indication information in the open-loop power parameters as the target open-loop power parameter if the open-loop power parameter indication information exists in the DCI; and
determine one of the open-loop power parameters as the target open-loop power parameter if no open-loop power parameter indication information exists in the DCI.

20. The terminal device of claim 17, wherein a cyclic redundancy check (CRC) for a physical downlink control channel (PDCCH) carrying the DCI is scrambled by a configured scheduling-radio network temporary identifier (CS-RNTI), and a new data indicator (NDI) field in the DCI has a value of 1.

* * * * *